United States Patent
Ogrinc et al.

(10) Patent No.: US 8,334,857 B1
(45) Date of Patent: Dec. 18, 2012

(54) METHOD AND SYSTEM FOR DYNAMICALLY CONTROLLING A DISPLAY REFRESH RATE

(75) Inventors: Michael A. Ogrinc, San Francisco, CA (US); Brett T. Hannigan, Philadelphia, PA (US); David Wyatt, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 965 days.

(21) Appl. No.: 11/957,375

(22) Filed: Dec. 14, 2007

(51) Int. Cl.
*G06F 3/038* (2006.01)
*G09G 5/00* (2006.01)
*G09G 5/36* (2006.01)
*H04N 7/01* (2006.01)

(52) U.S. Cl. ........ 345/204; 345/211; 345/213; 345/545; 345/629; 348/441

(58) Field of Classification Search .................. 345/204, 345/211–213, 501, 545–547, 629; 382/100, 382/192; 348/412.1–417.1, 441, 451–452
See application file for complete search history.

(56) References Cited

U.S. PATENT DOCUMENTS

| | | | |
|---|---|---|---|
| 6,222,881 B1 | 4/2001 | Walker | |
| 6,642,928 B1 | 11/2003 | Deming et al. | |
| 7,405,738 B2 | 7/2008 | Mance et al. | |
| 7,692,642 B2 | 4/2010 | Wyatt | |
| 2002/0015104 A1 | 2/2002 | Itoh et al. | |
| 2002/0027541 A1 | 3/2002 | Cairns et al. | |
| 2004/0252115 A1* | 12/2004 | Boireau | 345/211 |
| 2005/0114894 A1 | 5/2005 | Hoerl | |
| 2006/0056508 A1 | 3/2006 | Lafon et al. | |
| 2006/0146056 A1* | 7/2006 | Wyatt | 345/501 |
| 2006/0291558 A1 | 12/2006 | Schreier et al. | |
| 2007/0047660 A1 | 3/2007 | Mitani et al. | |
| 2007/0071404 A1 | 3/2007 | Curtner et al. | |
| 2007/0103387 A1 | 5/2007 | Kondo et al. | |
| 2007/0103585 A1 | 5/2007 | Takeuchi et al. | |
| 2007/0273787 A1* | 11/2007 | Ogino et al. | 348/441 |
| 2008/0055318 A1* | 3/2008 | Glen | 345/501 |
| 2008/0100598 A1 | 5/2008 | Juenger | |
| 2008/0152014 A1 | 6/2008 | Schreiber et al. | |
| 2008/0239143 A1* | 10/2008 | Shin et al. | 348/416.1 |
| 2009/0087016 A1* | 4/2009 | Berestov et al. | 382/100 |

OTHER PUBLICATIONS

Office Action, U.S. Appl. No. 11/957,379 dated Feb. 9, 2011.
Office Action, U.S. Appl. No. 11/957,374 dated May 11, 2011.

* cited by examiner

*Primary Examiner* — Bipin Shalwala
*Assistant Examiner* — Keith Crawley
(74) *Attorney, Agent, or Firm* — Patterson & Sheridan, LLP

(57) ABSTRACT

A method and system are implemented to dynamically control a display refresh rate. Specifically, one embodiment of the present invention sets forth a method, which comprises the steps of driving a display device at a first refresh rate over a period of time, measuring a number of first content frames with changes in content out of a plurality of content frames that are generated over the period of time for the display device, and driving the display device at a second refresh rate if the number of first content frames meets a first condition associated with a first threshold reference, and optionally driving the display device at a third refresh rate if the number of first content frames meets a second condition associated with a second threshold reference.

25 Claims, 10 Drawing Sheets

Trigger condition (8')= {Tracked display frame occurrences of at least more than N changed frame regions} > threshold reference REF8'

Trigger condition (3')= {Tracked display frame occurrences of less than N changed frame regions} > threshold reference REF3'

METHOD AND SYSTEM FOR DYNAMICALLY CONTROLLING A DISPLAY REFRESH RATE

BACKGROUND OF THE INVENTION

1. Field of the Invention

The present invention generally relates to display systems that support different display refresh rates, and more particularly to a method and system for dynamically controlling a display refresh rate.

2. Description of the Related Art

Unless otherwise indicated herein, the approaches described in this section are not prior art to the claims in this application and are not admitted to be prior art by inclusion in this section.

The refresh rate of a display device is the frequency at which display frames are repainted on a display device. Each refresh cycle of the display usually involves a series of processing steps, including accessing image data of multiple image surfaces rendered and stored in a frame buffer and combining the image surfaces to form a composite display frame. In parallel, the video signals corresponding to the composite display frame are also driven to the display device in order to scan out each pixel onto the screen of the display device. "Tearing" and other visual artifacts can occur when the asynchronous steps of rendering/compositing a frame and scanning out pixels occur out of sync. To avoid these artifacts visual computing devices typically do "flipping" wherein composition of new frame buffer contents is done in off-screen frame-buffer memory separate from the frame-buffer currently being scanned from, and then synchronize the scanning to begin on the new frame-buffer as the scan-out of the current frame-buffer has reached it's end. As these processing steps are repeated at a high frequency, they can consume significant amount of power.

For situations in which dynamic graphics contents are to be rendered on the screen, e.g., interactive 3D games where the frame buffer contents are switched at a high frequency, also referred to as a "high flipping rate", a refresh rate of at least 60 Hz is usually necessary to completely convey the changing pixels without missing any visual content on the display screen. However, in other instances where the frame buffer updates are occurring at a low flipping rate, e.g., such as when the display screen represents an idle or quasi-static Windows Desktop image without any inputs or cursor movements by the user, it may be visually acceptable to reduce the refresh rate of the display screen to reduce the power consumption.

U.S. Application Publication No. 2006/0146056 describes one technical approach for dynamically controlling the refresh rate of a display device. This technical approach, also described as a "temporal entropy approach using intra-frame entropy detection", detects significant rendering in a display frame by assessing a bounded area affected by the content updates. However, this approach involves a number of testing steps to detect the bounded area. To carry out these steps in a timely manner, additional hardware complexity is required and thus driving up the cost of implementing and validating this technical approach.

What is needed in the art is thus a method and system that can accurately and cost effectively evaluate changes in the content frame rate, and track with a matching refresh rate, leveraging information in the content itself such as the type of content, the scope of the content i.e. whether it will be the only content visible on the screen, the rate of change, and dynamically adjusting the display refresh rate to address at least the problems set forth above.

SUMMARY OF THE INVENTION

A method and system are implemented to dynamically control a display refresh rate. Specifically, one embodiment of the present invention sets forth a method, which comprises the steps of driving a display device at a first refresh rate over a period of time, measuring a number of first content frames with changes in content out of a plurality of content frames that are generated over the period of time for the display device, and driving the display device at a second refresh rate if the number of the first content frames meets a first condition associated with a first threshold reference, and optionally driving the display device at a third refresh rate if the number of first content frames meets a second condition associated with a second threshold reference.

At least one advantage of the present invention disclosed herein is the ability to evaluate a rate of change as well as a pattern of quantitative changes in the content of display frames, so that the display refresh rate can be dynamically controlled in an accurate and cost effective manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, the term "display frame" means an image frame that includes one or more image surfaces to be presented on the screen of a display device. Illustrative image surfaces include, without limitation, (i) a base surface, such as a computer desktop background, (ii) an overlay surface, such as a window representing an application program process overlaying the desktop background, and (iii) a cursor surface, such as a blinking carat indicative of a position on the screen. Further, the term "display frame content" refers to graphics data, such as pixel colors or transparency values, for the image represented in a composed display frame. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Figure 1A:
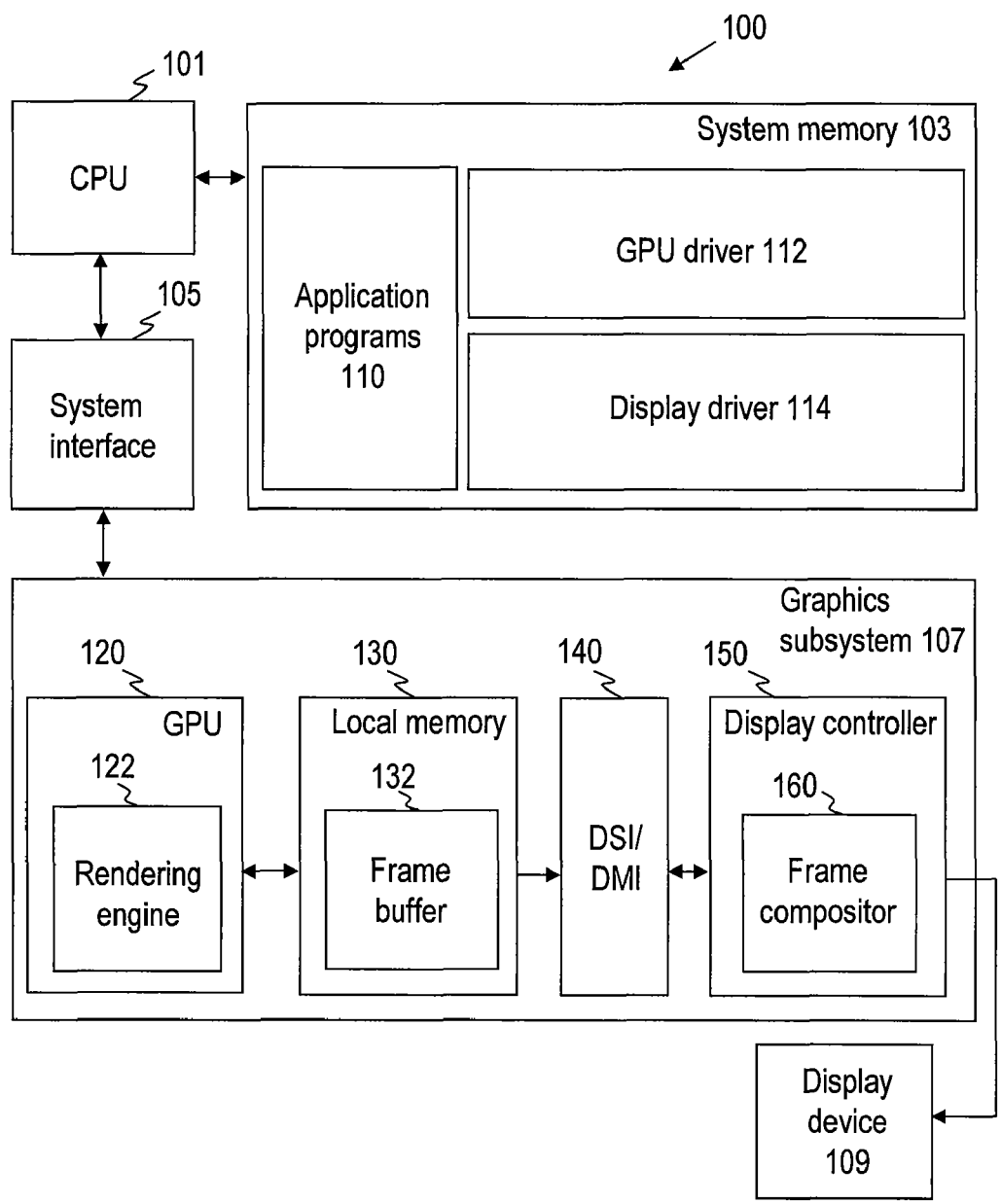
FIG. 1A is a conceptual diagram of a computer system configured to implement one or more aspects of the present invention.

FIG. 1A is a conceptual diagram of a computer system 100 configured to implement one or more aspects of the present invention. The computer system 100 includes a central processing unit (CPU) 101, a system memory 103, a system interface 105, a graphics subsystem 107, and a display device 109. The CPU 101 connects to the system memory 103 and the system interface 105. The CPU 101 executes programming instructions stored in the system memory 103, operates on data stored in the system memory 103, and communicates with the graphics subsystem 107 through the system interface 105. In alternate embodiments, the CPU 101, the graphics subsystem 107, the system interface 105, or any combination thereof, may be integrated into a single processing unit. Further, the functionality of the graphics subsystem 107 may be included in a chipset or in some other type of special purpose processing unit or co-processor. The system memory 103 typically includes dynamic random access memory (DRAM) configured to either connect directly to the CPU 101 (as shown) or alternately, via the system interface 105. The graphics subsystem 107 executes instructions received from the CPU 101 and processes the instructions in order to render graphics data and images for display on the display device 109. The display device 109 is an output device capable of emitting a visual image corresponding to an input data signal.

The graphics subsystem 107 includes a graphics processing unit (GPU) 120, a local memory 130, a display software/monitor interface (DSI/DMI) 140, and a display controller 150. The GPU 120 executes instructions received from the CPU 101 to render graphics data into images and stores such images in the local memory 130. In particular, a rendering engine 122 inside the GPU 120 generates and stores multiple image surfaces in a frame buffer 132 within the local memory 130. The DSI/DMI 140 is a link interface through which the display controller 150 communicates with the frame buffer 132 and device drivers. The display controller 150 accesses the frame buffer 132 through the DSI/DMI 140 at a specified rate to retrieve and merge the various image surfaces to present on the display device 109 for display. A frame compositor 160 within the display controller 150 is responsible for merging the image surfaces, which will be discussed in further details hereinafter.

The system memory 103 may include multiple application programs 110, a GPU driver 112, and a display driver 114. One application program 110 may invoke one or more instances of high-level shader programs that are designed to operate on the rendering engine 122 within the GPU 120. These high-level shader programs may be translated into executable program objects by a compiler or assembler included in the GPU driver 112 or alternatively by an offline compiler or assembler operating either on the computer system 100 or other computer systems. The display driver 114 causes the display controller 150 to access multiple image surfaces from the frame buffer 132 and compose display frames for presentation on the display device 109. In order to control the refresh rate of the display device 109, in one implementation, the display driver 114 also determines whether certain parameters computed by the frame compositor 160, such as a rate of changes in content over a period of time, has met some predefined threshold references.

Figure 1B:
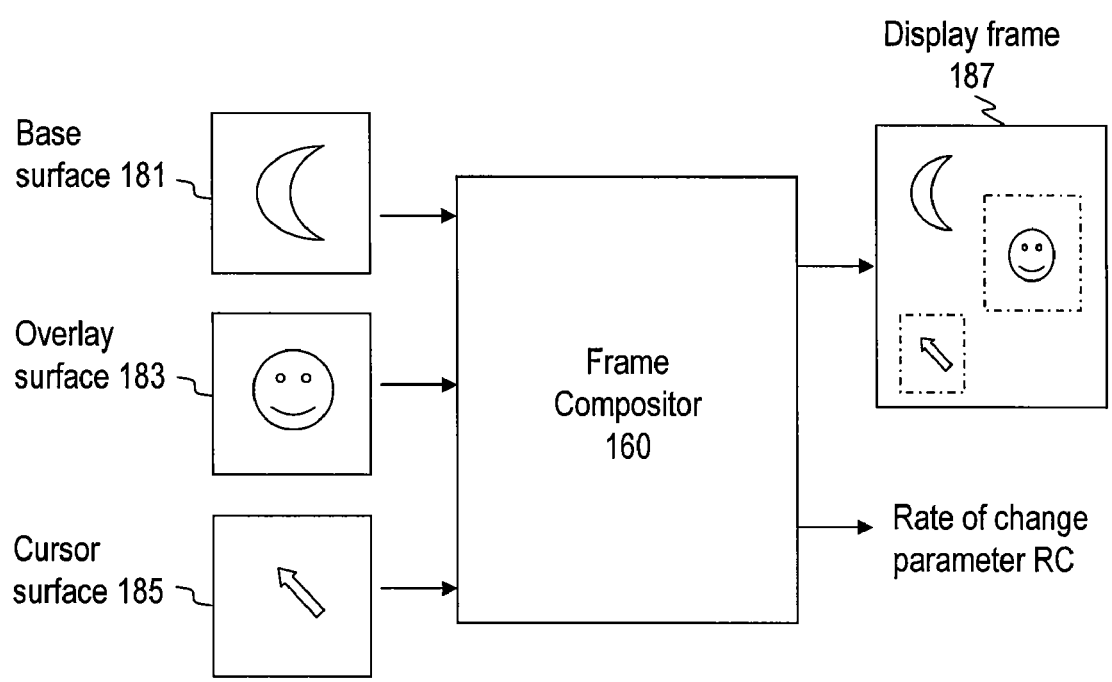
FIG. 1B is a simplified block diagram illustrating how the frame compositor 160 is configured to measure a rate of changes in content, according to one embodiment of the present invention.
Figure 1C:
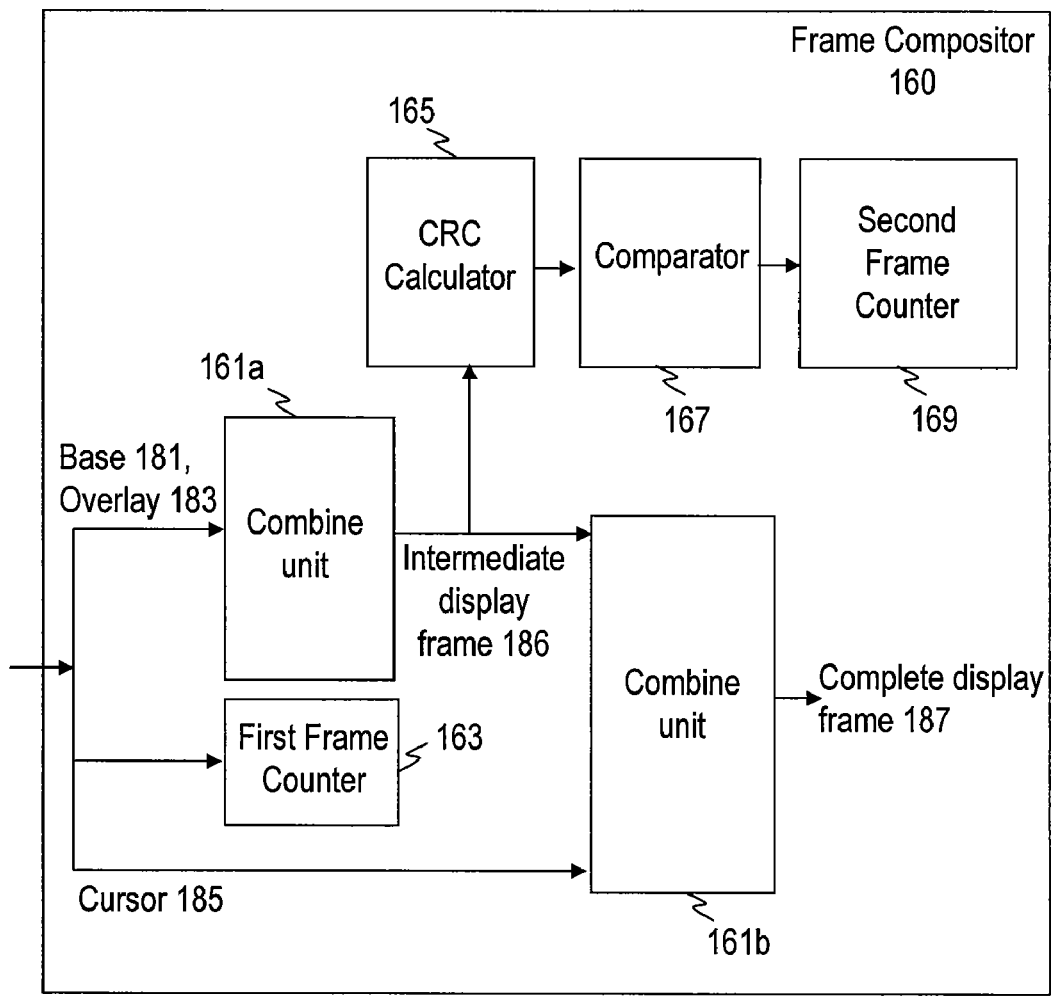
FIG. 1C illustrates a frame compositor suitable for tracking the rate of frame content change, according to one embodiment of the invention.
Figure 2A:
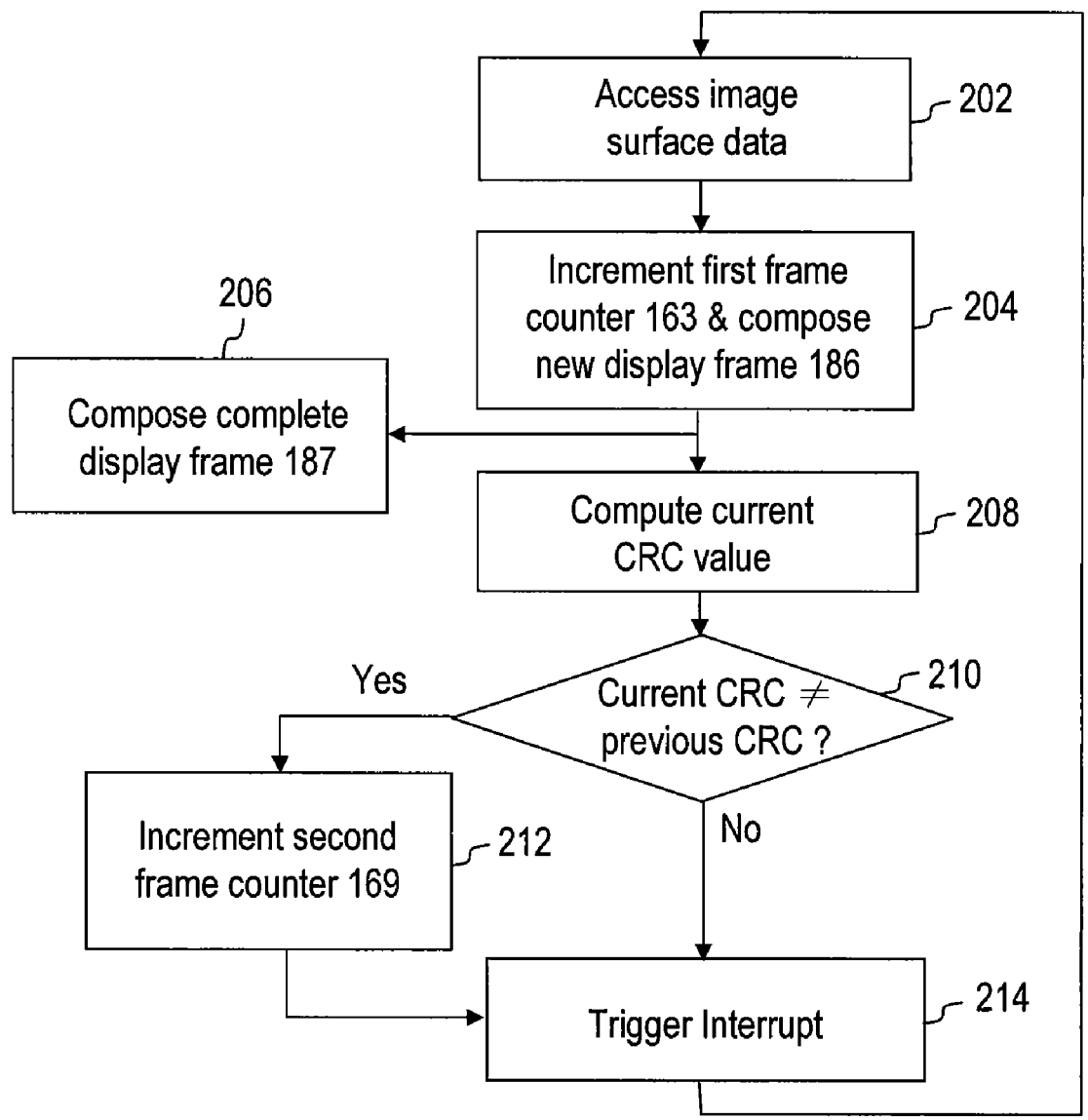
FIG. 2A is a flowchart showing the method steps of measuring a rate of frame content change over a period of time by a frame compositor, according to one embodiment of the present invention.
Figure 2B:
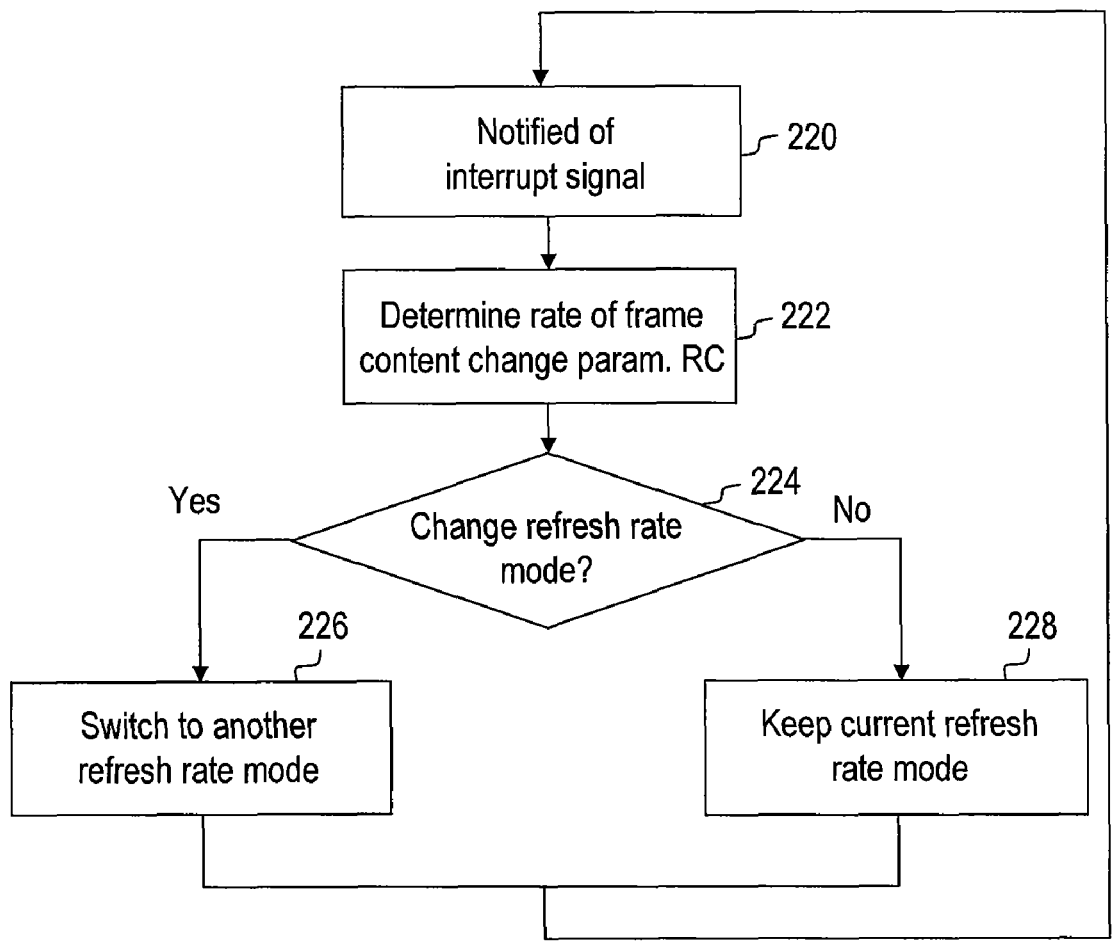
FIG. 2B is a flowchart showing the method steps for dynamically controlling the refresh rate of a display device based on the rate of frame content change parameter RC, according to one embodiment of the present invention.
Figure 2C:
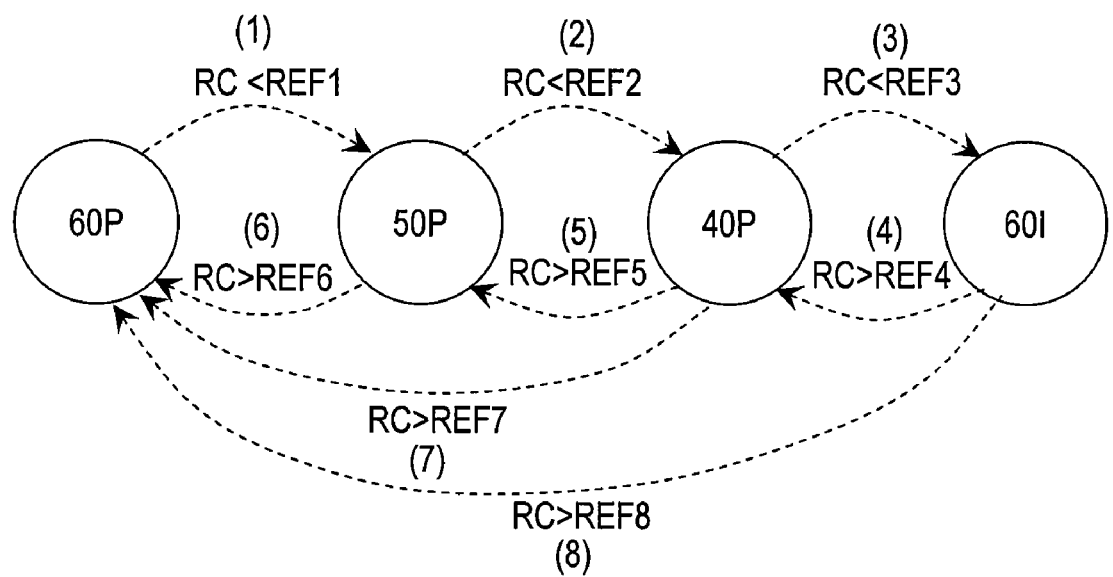
FIG. 2C is a state transition diagram that further illustrates how the display refresh rate is adjusted based on the RC parameter, according to one embodiment of the present invention.
Figure 2D:
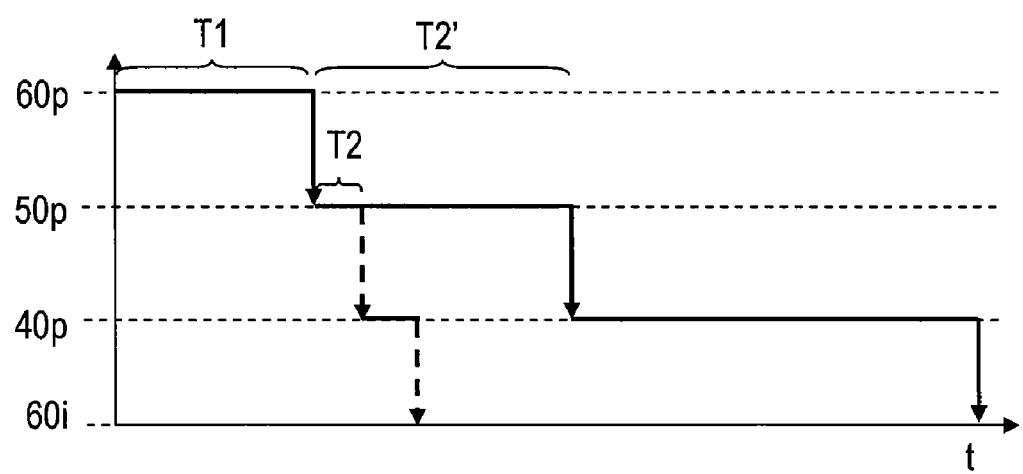
FIG. 2D is a timing sequence diagram showing an example of how the display driver is configured to transition from the highest refresh rate mode to the lowest refresh rate mode, according to an embodiment of the invention.

FIG. 1B and FIG. 1C are simplified block diagrams illustrating how the frame compositor 160 is configured to measure a rate of changes in content, according to one embodiment of the present invention. Referring to FIG. 1B and in conjunction with FIG. 1A, at each refresh cycle, the frame compositor 160 receives multiple image surface data stored in the frame buffer 132. In the illustrated embodiment, the multiple image surface data include a base surface 181, an overlay surface 183 and a cursor surface 185. The frame compositor 160 is configured to combine the image surfaces into a display frame 187 for presentation on the display device 109. In one embodiment for each newly generated display frame 187, the frame compositor 160 may also determine whether any content in the display frame 187 has changed from the previous frame by comparing the CRC of the previous & current frames, and use this to track the rate of frame content change in parameter RC, which is evaluated by the display driver 114, to control the display refresh rate. In other embodiments the RC parameter may be created by the driver directly comparing the CRC parameters and keeping a count of changed frames. Throughout this disclosure, the term "rate of frame content change parameter RC" is used interchangeably with "RC parameter." In one implementation, this RC parameter reflects a percentage of the number of frames of image surface data received by the frame compositor 160 having changing content.

It is worth noting that a change in the content of the display frame 187 may be the result of a change in the content of any of the base surface 181, overlay surface 183 and cursor surface 185 that compose the display frame 187. Also, any minimal change in one surface can cause a significant change in a numeric code representatively of the content of the display frame 187. One example of the numeric code is a cyclic redundancy check (CRC) code. Therefore, to avoid triggering an adjustment of the refresh rate when the measured change is due to trivial cursor movements, one approach is to measure the change in content in a partially composed display frame that includes the base surface 181 and overlay surface 183 and excludes the cursor surface 185.

FIG. 1C illustrates one implementation of the frame compositor 160 suitable for tracking the rate of frame content change, according to one embodiment of the invention. The frame compositor 160 includes two combine units 161*a* and 161*b*, a first frame counter 163, a CRC calculator 165, a comparator 167, and a second frame counter 169. The frame compositor 160 causes the first frame counter 163 to be incremented as it receives multiple image surface data, such as a base surface 181, an overlay surface 183, and a cursor surface 185. The first combine unit 161*a* generates an intermediate display frame 186 partially composed from the base surface 181 and overlay surface 183. The first frame counter is thereby an overall count of all composited frames regardless of whether there are changes in the frame contents or not. The second combine unit 161*b* composes a complete display frame 187 from the intermediate display frame 186 and the remaining image surface, such as the cursor surface 185. The intermediate display frame 186 is then put through the CRC calculator 165, which applies a CRC algorithm to compute a current CRC value associated with the content of the intermediate display frame 186. It is worth noting that although the CRC method is discussed herein, a person with ordinary skills in the art will recognize that other methods for generating a numerical code representative of the content of any display frame can be used. The comparator 167 then compares the current CRC value against a previous CRC value associated with a previous intermediate display frame generated by the first combine unit 161*a*. If the current CRC value differs from the previous CRC value, the content of the new intermediate display frame is deemed to be different from the content of the previous intermediate display frame, and the comparator 167 signals the second frame counter 169 to increment. Otherwise, the second frame counter 169 remains unchanged. The aforementioned RC parameter is thus the ratio between the value stored in the first frame counter 163 and the value stored in the second frame counter 169.

In conjunction with FIGS. 1A through 1C, FIG. 2A is a flowchart showing the method steps of measuring a rate of frame content change over a period of time by the frame compositor 160, according to one embodiment of the present invention. In the initial step 202, the combine unit 161*a* within the frame compositor 160 accesses one or more image surface data from the frame buffer 132. In step 204, the first combine unit 161*a* then merges the multiple image surfaces into a new intermediate display frame 186 and causes the frame counter 163 to be incremented by one. In step 206, the second combine unit 161*b* composes the complete display frame 187 from the intermediate display frame 186 and the cursor surface 185. In step 208, based on the new intermediate display frame 186, the CRC calculator 165 computes a current CRC value associated with the content of this new display frame 186. In step 210, the comparator 167 then compares the current CRC value against a previous CRC value associated with a previously composed display frame to determine whether there is a change in the frame content. If the current CRC value differs from the previous CRC value, then in step 212 the comparator 167 causes the second frame counter 169 to be incremented. On the other hand, if the current CRC value is equal to the previous CRC value, the second frame counter 169 is kept unchanged. In step 214, after the first frame counter 163 and the second frame counter 169 have been updated, the DSI/DMI 140 issues an Interrupt signal indicating the frame counters are ready to be accessed. The frame compositor 160 can then restart the aforementioned processing cycle for the next display frame.

In the illustrated embodiment, the Interrupt signal is issued for every completely composed display frame. However, in other embodiments, the Interrupt signal may be issued at intervals of more than one completely composed display frames. Based on the content of the first frame counter 163 and the second frame counter 169, the rate of frame content change parameter RC can be derived by determining the ratio between the values in the two counters. In an alternative embodiment, a person skilled in the art will readily appreciate that the RC parameter can still be derived by using the second frame counter 169 to track the occurrences of the new CRC value equaling to the previous CRC value (i.e., indicating no change in change).

Again in conjunction with FIGS. 1A through 1C, FIG. 2B is a flowchart showing the method steps for dynamically controlling the refresh rate of the display device 109 based on the rate of frame content change parameter RC, according to one embodiment of the present invention. In the initial step 220, the display driver 114 is notified of an Interrupt signal issued by the DSI/DMI 140. As described above, the Interrupt signal indicates that the first and the second frame counters 163 and 169 have been updated. In step 222, the display driver 114 accesses the first and the second frame counters 163 and 169 through the DSI/DMI 140 and calculates the RC parameter in the following manner: the total number of frames in which the content has changed divided by the total number of frames received by the frame compositor 160 within a time period. In step 224, based on the value of the measured RC parameter, the display driver 114 then determines whether the refresh rate needs to be changed. If the refresh rate needs to be changed, the display driver 114 then drives the display device 109 to switch to another refresh rate in step 226. Otherwise, the current refresh rate is kept in step 228. After the refresh rate has been adjusted, the display driver 114 waits for the next Interrupt signal to determine whether the refresh rate mode needs to be readjusted.

In conjunction with FIG. 2B and FIGS. 1A-1C, FIG. 2C is a schematic state transition diagram that further illustrates how the display refresh rate is adjusted based on the RC parameter, according to one embodiment of the invention. Driven by the display driver 114, the display device 109 can be configured to refresh its display screen at different refresh rates set in a plurality of refresh rate modes, such as 60P, 50P, 40P, and 60I. For example, a progressive refresh rate of 60 Hz may be set in the refresh rate mode 60P, a progressive refresh rate of 50 Hz in the refresh rate mode 50P, a progressive refresh rate of 40 Hz in the refresh rate mode 40P, and an interlaced refresh rate of 60 Hz in the refresh rate mode 60I. While operating in a certain refresh rate mode, the display device 109 may switch to either a lower or a higher refresh rate mode, if the display driver 114 determines that the rate of frame content change parameter RC either drops below or exceeds a specified threshold reference, respectively.

To illustrate, suppose that the display device 109 is operating in the refresh rate mode 60P. After the determination of the RC parameter based on the updated first frame counter 163 and the second frame counter 169 as described above in connection with FIG. 2B, the display driver 114 compares the RC parameter against a threshold reference REF1 representing a threshold rate of frame content changes that is equal to or less than the refresh rate set in the lower refresh rate mode 50P. For example, the threshold reference REF1 may correspond to 50 frames with changes in content per second. If the RC parameter is smaller than the threshold reference REF1, then the trigger condition (1) shown in FIG. 2C and discussed below is met. In response, the display driver 114 switches the display device 109 from the refresh rate mode 60P down to the lower refresh rate mode 50P. While in the refresh rate mode 50P, the display driver 114 then may evaluate the RC parameter to determine which of a trigger condition (2) or (6) is met to exit the refresh rate mode 50P toward either the lower refresh rate mode 40P or back to the refresh rate mode 60P, respectively. In this manner, each transition from a higher refresh rate mode down to a lower refresh rate mode, or reversely, each transition from a lower refresh rate mode back up to a higher refresh rate mode, is controlled by evaluating whether the RC parameter meets one of the listed trigger conditions below:

(1) "RC<REF1" triggers a transition from the refresh rate mode 60P to 50P;
(2) "RC<REF2" triggers a transition from the refresh rate mode 50P to 40P;
(3) "RC<REF3" triggers a transition from the refresh rate mode 40P to 60I;
(4) "RC>REF4" triggers a transition from the refresh rate mode 60I to 40P;
(5) "RC>REF5" triggers a transition from the refresh rate mode 40P to 50P;
(6) "RC>REF6" triggers a transition from the refresh rate mode 50P to 60P;
(7) "RC>REF7" triggers a transition from the refresh rate mode 40P to 60P;
(8) "RC>REF8" triggers a transition from the refresh rate mode 60I to 60P.

The threshold references REF1, REF2, and REF3 correspond to different rates of frame content changes in a descending order, and each is used to trigger the transition toward a lower refresh rate mode. On the other hand, the threshold references REF4, REF5 and REF6 correspond to different rates of frame content changes in an ascending order, and each is used to trigger the transition toward a higher refresh rate mode. As shown with the trigger conditions (7) and (8) above, a direction transition from one refresh rate mode to another is achievable without needing to transition through intermediate refresh rate modes (e.g., transition from 40P to 60P without needing to go through 50P or transition from 60I to 60P without needing to go through 40P or 50P).

A problem occurs when attempting to determine whether a higher refresh rate than the current state is required, when the content rate is in fact limited by the refresh rate. To illustrate, assume the display device 109 is currently operating in the refresh rate mode 40$p$ as per FIG. 2C, and the source content is being presented in sync with the display in order to avoid tearing. The contents will then be flipped in sync with the refresh rate. In this mode of operation, since the flipping limits the maximum content rate to equal to the refresh rate, it is impossible to determine if visual quality is being lost because the content could be presented faster. In this situation, threshold reference REF5 would be set to equal 40$p$, and threshold reference REF6 would be set to 50$p$. In order to determine if full visual quality requires a higher refresh rate when the content rate equals REF5 or REF6, the refresh rate is first increased one state and the content rate is re-evaluated. If the content rate again equals the refresh rate threshold, the process is repeated. In one embodiment, if the content rate does not rise with the increase in refresh rate the refresh rate may remain in the same state until the content rate lowers. In another embodiment, the refresh rate may be restored to its original lower state again if the content rate does not rise.

In conjunction with FIG. 1A and FIGS. 2A-2B, FIG. 2D is a timing sequence diagram showing an example of how the display driver 114 is configured to transition from the highest refresh rate mode 60P to the lowest refresh rate mode 60I, according to an embodiment of the invention. Suppose the display device 109 initially operates at the highest refresh rate mode 60P. To evaluate whether the trigger condition (1) is met, the number of display frames with changes in content are tracked among the display frames generated over a period of time T1 according to the method steps described above in conjunction with FIG. 2A. If the number of tracked display frame occurrences meets the trigger condition (1) within T1, then the display driver 114 switches the display device 109 from the refresh rate mode 60P to the lower refresh rate mode 50P. Then, to evaluate whether the trigger condition (2) is met, the number of display frame occurrences with changes in content continues to be aggregated and is further added to the number of display frame occurrences previously tracked in T1. In this manner, if the number of tracked display frame occurrences over the period of time T1 is relatively small and the number of tracked display frame occurrences over the period of time T2 is also relatively small, then the trigger condition (2) may be met over a significantly shorter period of T2 than T1. On the other hand, for the same small number of display frame occurrences counted over the period of time T1, if the number of display frame occurrences with changes in content detected subsequent to T1 is still small but relatively higher than the number counted in T1, then a longer period of time T2' may be required before the trigger condition (2) is met and before the transition from the refresh rate mode 50P down to the refresh rate mode 40P. The same mechanism applies in the evaluation of the trigger condition (3) to switch from the refresh rate mode 40P to the refresh rate mode 60I. All the trigger conditions (1)~(3) are evaluated in a continuous and parallel manner. It may take more or less time to reach the lowest refresh rate mode 60I depending on the actual display frame occurrences with changes in content, as illustrated with the dotted line path and solid line path in FIG. 2D. With the concurrent evaluations of multiple triggers, the transition from the highest refresh rate mode 60P through intermediate refresh rate modes 50P and 40P to the lowest refresh rate mode 60$i$ can occur in an efficient way.

In addition, in some instances, transitioning away from a refresh rate mode may be triggered by multiple trigger conditions, such as the trigger conditions (3), (5) and (7) for possibly triggering the transitioning away from the refresh rate mode 40P. In one implementation, for efficiency purposes, all the trigger conditions are thus evaluated in parallel and concurrently.

When the contents to be displayed are from a single known source and the contents fill the entire screen (i.e. no other windows or content streams are visible or overlaid), such as when viewing full-screen playback of video content, then an alternate method may be used. Because video content comes from a recording device with a fixed known source content rate, it is not necessary to measure the display rate after composition in order to know the upper bounded or highest possible frame rate of the content. While the video content may have lower motion than this rate, it is not possible for it to have a higher rate in its original form. In this special situation where the source content rate is known, the process of determining if a lower refresh rate can be utilized can be further simplified and avoids the need to measure the post-composition change rate.

As has been described above, the refresh rate of the display device can be dynamically adjusted based on the evaluation of a measured rate of frame content change parameter RC against multiple trigger conditions (1)~(8). However, in certain instances, an evaluation of the RC parameter alone may not be sufficient to adequately control the refresh rate. For example, when multiple applications share different areas of the same display screen, it may be difficult to determine which refresh rate mode is adequate. Thus, it is desirable to have a display driver capable of evaluating not only based on the frequency of changes, but also based on how much change in the content of the display frame.

Figure 3A:
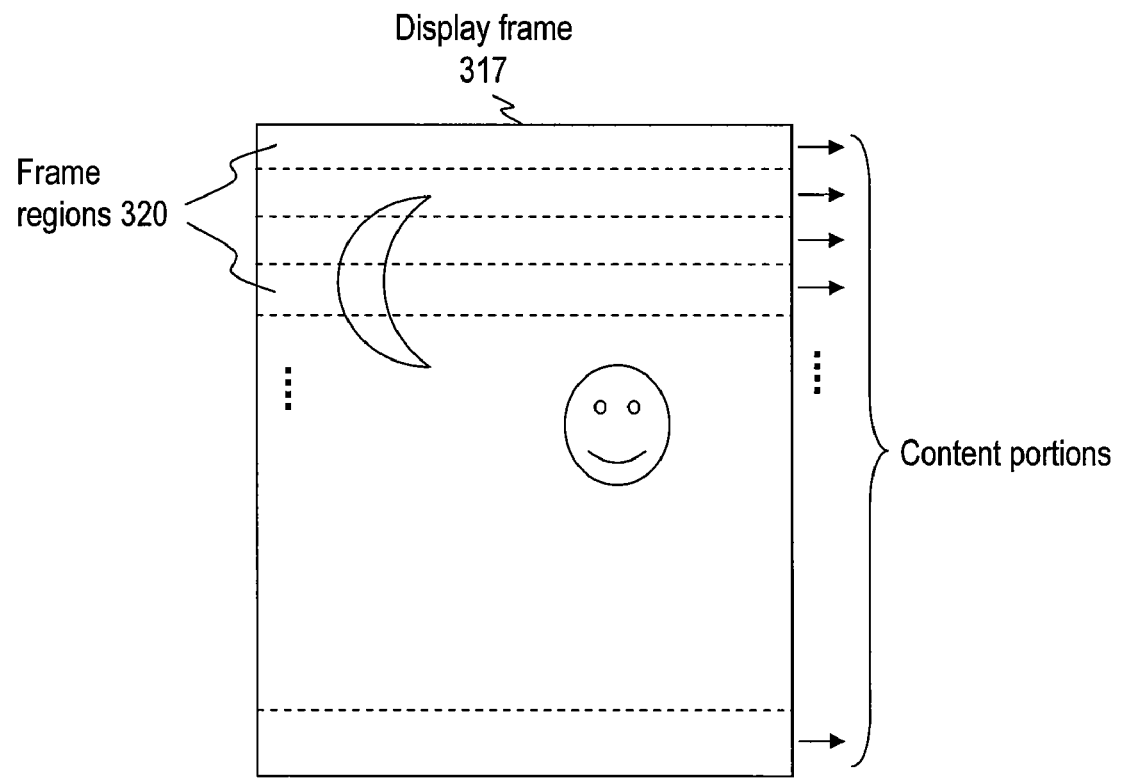
FIG. 3A is a conceptual diagram illustrating how quantitative changes in content are measured in a display frame, according to one or more aspects of the present invention.

FIG. 3A is a conceptual diagram illustrating how quantitative changes in content are measured in a display frame 317 according to one or more aspects of the present invention. The area of the display frame 317 is divided into an array of individual frame regions 320, each covering a subset of the content in the display frame 317. In the illustrated embodiment, each of the frame regions 320 corresponds to a strip-shaped area encompassing a predetermined number of pixel rows and is laid out contiguously relative to one another. However, in alternate embodiments, each of the frame regions 320 may cover a differently-shaped area than the strip-shaped area. To estimate the amount of changes in the content of the display frame 317, every frame region 320 of the display frame 317 is separately evaluated to determine whether its associated content has changed since the previous display frame. To determine a change in the content of one frame region 320, a CRC comparison method similar to the embodiment described in conjunction with FIG. 1C may be applied at the scale of the frame region 320. A frame region 320 that is determined to have changed its associated content is also referred to as a "changed frame region" hereinafter. Then, these changed frame regions are counted to generate an aggregated number representative of the amount of change in the content of the display frame 317. Since the change in the content of a display frame can be quantitatively measured, the trigger conditions shown in FIG. 2C can be finely defined to test certain patterns of changes over a period of time.

Figure 3B:
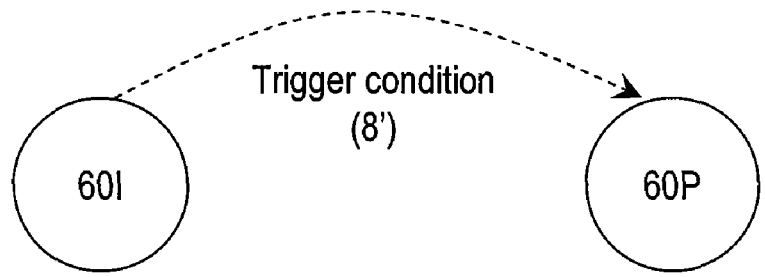
FIG. 3B is a conceptual diagram illustrating how one refresh rate mode is switched to another refresh rate mode based on the evaluation of a pattern of quantitative changes in the content of display frames, according to one or more aspects of the present invention.

In conjunction with FIG. 3A, FIG. 3B is a simplified diagram showing an example of a refined trigger condition (8') that controls the transition from the refresh rate mode 60I to the refresh rate mode 60P. Instead of evaluating a rate of frame content changes, the trigger condition (8') now evaluates the occurrence of a pattern of changes in content. This condition is met when a number of display frame occurrences that are characterized as having more than N number of changed frame regions is greater than a threshold reference REF8'. The N number of changed frame regions characterizes an amount of changes in content associated with the pattern of change. Depending on how the number N and the threshold reference REF8' are set, different types of patterns of content changes may be detected via the trigger condition (8'). In one example, the occurrence of a slight continuous motion may be detected by setting a small value for N and a high number of display frames for the threshold reference REF8'. In another example, the occurrence of a significant motion may be detected by setting a high value for N and a small number of display frames for the threshold reference REF8'. It is understood that a combination of multiple trigger conditions may be evaluated to control the transition from one refresh rate mode to another. In this case, a switch from the refresh rate mode 60I to the refresh rate mode 60P may occur when either a slight continuous motion or a significant motion defined above is detected. In the same manner, other adapted trigger conditions may be set to control the transition between any of refresh rate modes 60P, 50P, 40P and 60I.

Figure 3C:
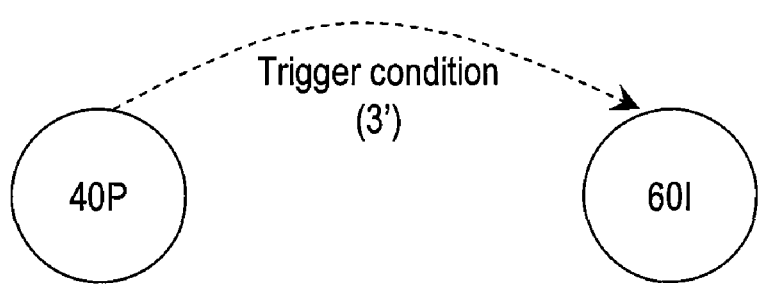
FIG. 3C is a conceptual diagram illustrating another example of evaluating a pattern of quantitative changes in the content of display frames, according to one or more aspects of the present invention.
Figure 3D:
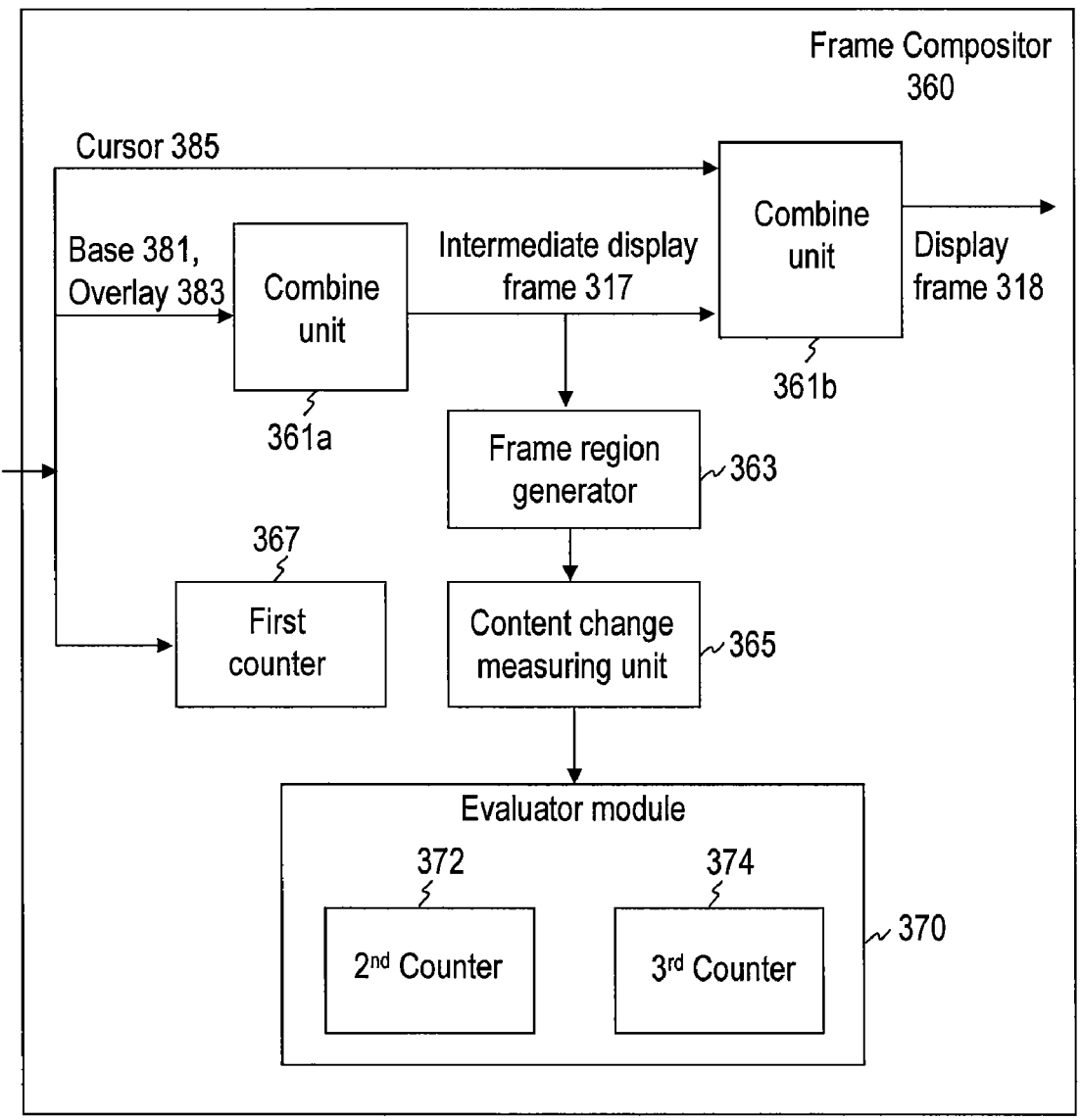
FIG. 3D is a schematic diagram showing a frame compositor configured to measure and detect the occurrence of a pattern of quantitative changes in the content of display frames, according to one embodiment of the present invention.

FIG. 3C illustrates another example of a trigger condition (3') configured to control the transition from the refresh rate mode 40P to the refresh rate mode 60I. More specifically, the trigger condition (3') tests whether a number of tracked display frame occurrences that are characterized as having less than N number of changed frame regions is greater than a threshold reference REF3'. By setting a small value for the number N and a high number of display frames for the threshold reference REF3', the occurrence of a very slight motion may be detected via the trigger condition (3').

As has been described above, based on the setting of trigger conditions that include quantitative change parameters, the occurrence of certain patterns of content changes in display frames thus can be detected to control the transition from one refresh rate mode to another. To track the occurrences of display frames having a specified pattern of changes, specific tracking counters may be set within the frame compositor.

In conjunction with FIGS. 3A-3C and FIG. 1A, FIG. 3D illustrates one implementation of a frame compositor 360 suitable for tracking quantitative changes in content through display frames, according to one embodiment of the invention. Specifically, in one implementation, the frame compositor 360 includes two combine units 361a and 361b, a frame region generator 363, a content change measuring unit 365, a first counter 367, and an evaluator module 370. The frame compositor 360 causes the first counter 367 to be incremented by one as it receives multiple image surface data, such as a base surface 381, an overlay surface 383, and a cursor surface 385. The first combine unit 361a composes an intermediate display frame 317 with the base surface 381 and overlay surface 383. The second combine unit 361b composes a complete display frame 318 from the intermediate display frame 317 and the remaining image surface, such as the cursor surface 385. The intermediate display frame 317 is divided into an array of frame regions 320 through the frame region generator 363. The frame region generator 363 sets certain parameters for the frame regions 320, such as the size of each frame region 320 and a total number of the frame regions 320 in the intermediate display frame 317. As discussed above, in one implementation, the array of frame regions 320 can include a series of parallel horizontal strips laid out in a contiguous manner, each of which including a predetermined number of pixel rows.

The content associated with every frame region 320 in the intermediate display frame 317 is put through the content change measuring unit 365 that determines how many frame regions have changed in content. In one implementation, the content change measuring unit 365 may apply a CRC comparison method similar to the embodiment shown in FIG. 1C, by which it compares a current CRC value of each frame region 320 against a previously calculated CRC value associated with the same frame region 320 in the previous intermediate display frame 317. If the current CRC value differs from the previous CRC value, the content portion associated with this frame region 320 is deemed to have changed between the current and the previous intermediate display frame 317. All the changed frame regions 320 that are identified by this comparison of CRC values are counted, and the resulting value is updated in a counter (not shown in FIG. 3D) within the content change measuring unit 365. This resulting value represents the amount of changes in content for each of the intermediate display frame 317 currently generated. Based on the value provided by the content change measuring unit 365, the evaluator module 370 tracks the occurrences of display frames 317 that comply with certain patterns of quantitative changes in content via a plurality of counters, such as a second counter 372 and a third counter 374. For example, the second counter 372 may track the number of display frame occurrences having more than a N number of changed frame regions as defined in the trigger condition (8') shown in FIG. 3B, while the third counter 374 may track the number of display frame occurrences having less than a N number of changed frame regions as defined in the trigger condition (3') shown in FIG. 3C. When either of these counters 372 and 374 exceeds a respective threshold reference, such as REF8' and REF3', an interrupt signal is then issued to notify the display driver 114 of FIG. 1A that either of the corresponding trigger condition (8') and (3') is met. The refresh rate mode then can be switched accordingly.

As has been described above, the method and system described herein thus is able to evaluate a rate of change as well as a pattern of quantitative changes in the content of display frames, so that the display refresh rate can be dynamically adjusted in an accurate and cost effective manner.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A method for dynamically controlling a display refresh rate, comprising:
    driving a display device at a first refresh rate at a time t;
    deriving a measured content rate based on a number of first content frames with changes in content out of a plurality of content frames that are generated over a period of time between the time t and a time t1 for the display device, wherein deriving the measured content rate comprises:
        merging multiple image surfaces into an intermediate display frame and incrementing a first frame counter;
        comparing a value associated with the intermediate display frame to a value associated with a previous intermediate display frame to determine if there is a change in frame content; and
        incrementing a second frame counter if there is a change in frame content;
    driving the display device at a second refresh rate when the number of first content frames during the period of time between the time t and the time t1 meets a first condition associated with a first threshold reference;
    deriving another measured content rate based on the number of first content frames with changes in content out of a plurality of content frames that are generated over a period of time between the time t and a time t2 for the display device;
    driving the display device at a third refresh rate when the number of first content frames during the period of time between the time t and the time t2 meets a second condition associated with a second threshold reference; and
    increasing the first refresh rate to the second refresh rate before deriving the measured content rate, wherein a maximum content rate of the content frames is limited by the first refresh rate and the second condition includes the second threshold reference configured to be higher than the first refresh rate.

2. The method of claim 1, wherein the measured content rate causes the first condition to be met when the measured content rate falls below the first threshold reference.

3. The method of claim 1, wherein the another measured content rate causes the second condition to be met when the another measured content rate rises above the second threshold reference.

4. The method of claim 1, wherein the first condition may be met if a single content stream fully occupies the entire screen area of the display device and a pre-known content rate for the single content stream meets the first threshold reference.

5. The method of claim 4, wherein the second condition may be met if the single content stream fully occupies the entire screen area and the pre-known content rate for the single content stream meets the second threshold reference.

6. The method of claim 1, further comprising evaluating an inter-frame difference at the end of a vertical refresh and recording the number of the first content frames with changes in content and the plurality of content frames that have passed.

7. The method of claim 1, wherein the another measured content rate meets the second condition and exceeds the second threshold reference, thereby causing a transition to the third refresh rate.

8. The method of claim 1, wherein the measured content rate neither meets the second condition nor exceeds the second threshold reference, thereby causing the first refresh rate to remain unaffected.

9. The method of claim 1, wherein the plurality of content frames generated over the period of time between the time t and the time t1 are composed from a base surface and a plurality of higher Z-order surfaces.

10. A computer-readable medium containing a sequence of instructions, which when executed by a computing device coupled to a display device, causes the computing device to:
    drive the display device at first refresh rate at a time t;
    derive a measured content rate based on a number of first content frames with changes in content out of a plurality of content frames that are generated over a period of time between the time t and a time t1 for the display device, wherein deriving the measured content rate comprises:
        merging multiple image surfaces into an intermediate display frame and incrementing a first frame counter;
        comparing a value associated with the intermediate display frame to a value associated with a previous intermediate display frame to determine if there is a change in frame content; and
        incrementing a second frame counter if there is a change in frame content:
    drive the display device at a second refresh rate when the number of first content frames during the period of time between the time t and the time t1 meets a first condition associated with a first threshold reference;
    derive another measured content rate based on the number of first content frames with changes in content out of a plurality of content frames that are generated over a period of time between the time t and a time t2 for the display device;
    drive the display device at a third refresh rate when the number of first content frames during the period of time between the time t and the time t2 meets a second condition associated with a second threshold reference; and
    increase the first refresh rate to the second refresh rate before deriving the measured content rate, wherein a maximum content rate of the content frames is limited by the first refresh rate and the second condition includes the second threshold reference configured to be higher than the first refresh rate.

11. The computer readable medium of claim 10, wherein the measured content rate causes the first condition to be met when the measured content rate falls below the first threshold reference.

12. The computer readable medium of claim 10, wherein the another measured content rate causes the second condition to be met when the another measured content rate rises above the second threshold reference.

13. The computer readable medium of claim 10, wherein the first condition may be met if a single content stream fully occupies the entire screen area of the display device and a pre-known content rate for the single content stream meets the first threshold reference.

14. The computer readable medium of claim 13, wherein the second condition may be met if the single content stream fully occupies the entire screen area and the pre-known content rate for the single content stream meets the second threshold reference.

15. The computer readable medium of claim 10, further comprising a sequence of instructions, which when executed by the computing device, causes the computing device to evaluate an inter-frame difference at the end of a vertical refresh and record the number of the first content frames with changes in content and the plurality of content frames that have passed.

16. The computer readable medium of claim 10, wherein the another measured content rate meets the second condition and exceeds the second threshold reference, thereby causing a transition to the third refresh rate.

17. The computer readable medium of claim 10, wherein the measured content rate neither meets the second condition nor exceeds the second threshold reference, thereby causing the first refresh rate to remain unaffected.

18. The computer readable medium of claim 10, wherein the plurality of content frames generated over the period of time between the time t and the time t1 are composed from a base surface and a plurality of higher Z-order surfaces.

19. A computing device, comprising:
system memory, and
a graphics subsystem, wherein the graphics subsystem is configured to:
  drive a display device at a first refresh rate at a time t;
  derive a measured content rate based on a number of first content frames with changes in content out of a plurality of content frames that are generated over a period of time between the time t and a time t1 for the display device, wherein deriving the measured content rate comprises:
    merging multiple image surfaces into an intermediate display frame and incrementing a first frame counter;
    comparing a value associated with the intermediate display frame to a value associated with a previous intermediate display frame to determine if there is a change in frame content; and
      incrementing a second frame counter if there is a change in frame content;
  drive the display device at a second refresh rate when the number of first content frames during the period of time between the time t and the time t1 meets a first condition associated with a first threshold reference;
  derive another measured content rate based on the number of first content frames with changes in content out of a plurality of content frames that are generated over a period of time between the time t and a time t2 for the display device;
  drive the display device at a third refresh rate when the number of first content frames during the period of time between the time t and the time t2 meets a second condition associated with a second threshold reference; and
  increase the first refresh rate to the second refresh rate before deriving the measured content rate, wherein a maximum content rate of the content frames is limited by the first refresh rate and the second condition includes the second threshold reference configured to be higher than the first refresh rate.

20. The method of claim 1, wherein the value associated with the intermediate display frame and the value associated with the previous intermediate display frame are cyclical redundancy check values.

21. The computer readable medium of claim 10, wherein the value associated with the intermediate display frame and the value associated with the previous intermediate display frame are cyclical redundancy check values.

22. The computing device of claim 19, The computer readable medium of claim 11, wherein the value associated with the intermediate display frame and the value associated with the previous intermediate display frame are cyclical redundancy check values.

23. The method of claim 1, wherein the multiple image surfaces include a base surface and an overlay surface, and exclude a cursor surface.

24. The computer readable medium of claim 10, wherein the multiple image surfaces include a base surface and an overlay surface, and exclude a cursor surface.

25. The computing device of claim 19, wherein the multiple image surfaces include a base surface and an overlay surface, and exclude a cursor surface.

* * * * *